United States Patent [19]

Bouyer

[11] Patent Number: 4,934,560
[45] Date of Patent: Jun. 19, 1990

[54] TANGENTIAL DISTRIBUTOR OF STOPPERS OR THE LIKE

[75] Inventor: Marc Bouyer, Bordeaux, France

[73] Assignee: S.A.R.L. Proto Gamma, Floirac, France

[21] Appl. No.: 128,753

[22] Filed: Dec. 3, 1987

[30] Foreign Application Priority Data

Dec. 3, 1986 [FR] France ................................ 86 17017

[51] Int. Cl.$^5$ ............................................. B65H 1/00
[52] U.S. Cl. ................................... 221/156; 221/192; 198/392; 414/291
[58] Field of Search ............... 198/392; 221/156, 157, 221/158, 159, 160, 192; 414/291; 222/148, 241

[56] References Cited

U.S. PATENT DOCUMENTS

| | | | |
|---|---|---|---|
| 3,709,354 | 1/1973 | Petict | 221/156 X |
| 3,726,385 | 4/1973 | Sterling | 198/392 |
| 3,883,011 | 5/1975 | Pennell | 414/291 |
| 4,560,086 | 12/1985 | Stol | 221/192 X |

Primary Examiner—Michael S. Huppert
Attorney, Agent, or Firm—Robert J. Koch

[57] ABSTRACT

The invention relates to a tangential distributor for stoppers of a given length and diameter. The distributor comprises a pair of rotating coaxial plates separated by a vertical distance which is slightly more than one stopper diameter. Between these plates is formed a passageway between a central portion of the plates and a peripheral area. Properly aligned stoppers are removed from this peripheral area. A baffle is formed into the passageway to orient the stoppers and allow only those oriented tangentially to the plates to pass into the peripheral area. A guide around the peripheral area retains the stoppers in the peripheral area until they are removed. The plates may be rotated at variable velocities for control of the rate of removal and orientation.

11 Claims, 3 Drawing Sheets

TANGENTIAL DISTRIBUTOR OF STOPPERS OR THE LIKE

The present invention relates to a tangential distributor for stoppers.

It is an objective of the invention to provide a machine capable of distributing stoppers at a high rate.

SUMMARY OF THE INVENTION

For this purpose, the tangential stopper distributor comprises (1) a first circular, horizontally-rotating plate with a vertical axle; (2) a supply of stoppers; (3) means for moving stoppers from the supply and placing them on the rotating plate; and (4) a means for guiding and removing the stoppers from said plate. The guidance means comprises a second plate having an annular configuration and being located coaxially under the first circular plate. The second plate is entrained in rotation at a variable velocity simultaneously with the first plate.

Between the two plates is a stopper passage which is adjustable in height and slightly larger than a stopper diameter. The stopper passage comprises a first section level with the upper surface of the first plate and a second section located at a slightly lower level opening onto the periphery of the plates. The two sections are connected by a bent passage with a width appreciably greater than one diameter of the stoppers, but substantially less than their length.

A stationary circular guide is located on the periphery of the plates facing the opening of said bent passage. The guide is connected with a tangential discharge chute.

According to a further embodiment, one apparatus for moving stoppers from the supply and placing them on the first plate comprises an Archimedian screw elevator. The screw lifts the stoppers from a trough located under said plates and discharges the stoppers onto the upper surface of the first circular plate. Such a distributor is remarkably efficient in view of the rapid and reliable placement of stoppers on the first plate in a circular collection zone.

The use of rotating plates and a baffle passage permits a high rate of stopper discharge. Stoppers are not able to become jammed or block the rotating plates due to the plate spacing. In case stopper discharge is terminated, the plates continue to rotate while "sliding" past those stoppers immobilized in the circular collecting chute.

Further characteristics and advantages will become apparent from the description hereinbelow of a mode of embodiment of the distributor according to the invention, said description being presented as an example only and with reference to the drawings attached hereto.

DETAILED DESCRIPTION OF THE PREFERRED EMBODIMENT

Figure 1:
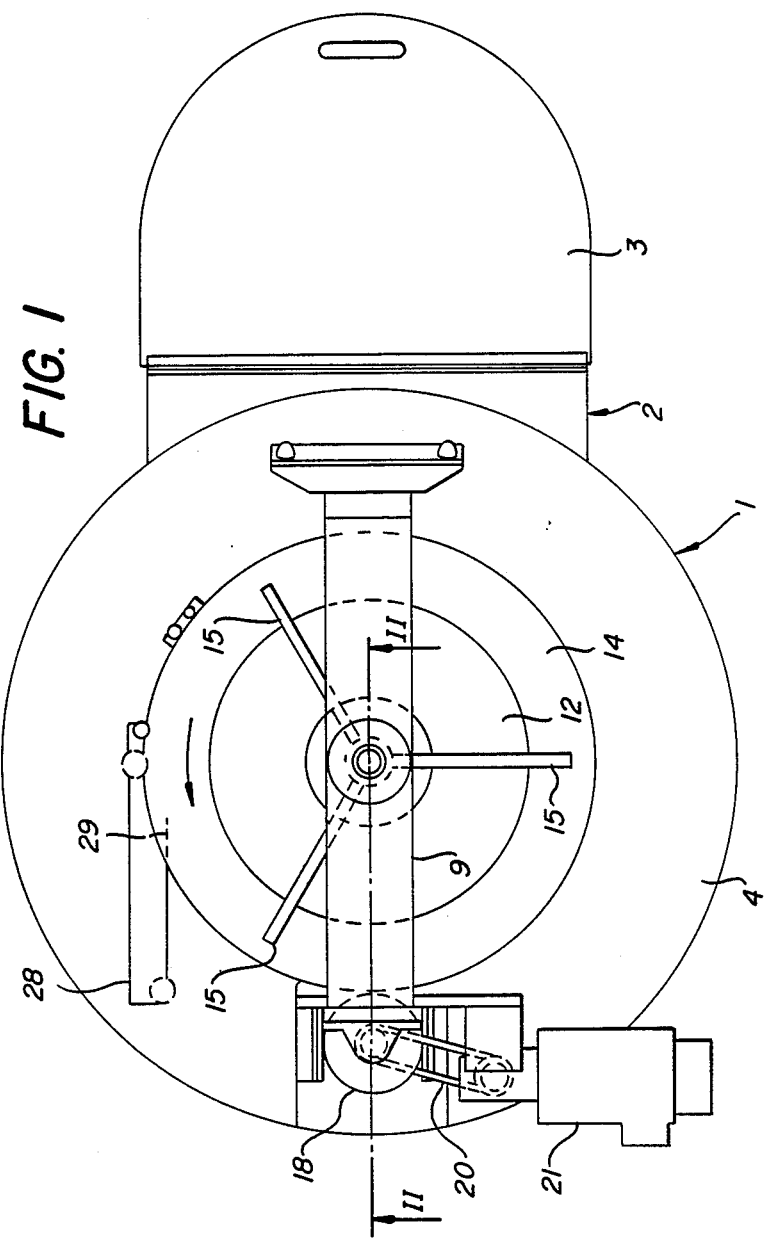
FIG. 1 is a top elevation of a distributor according to the invention.
Figure 2:
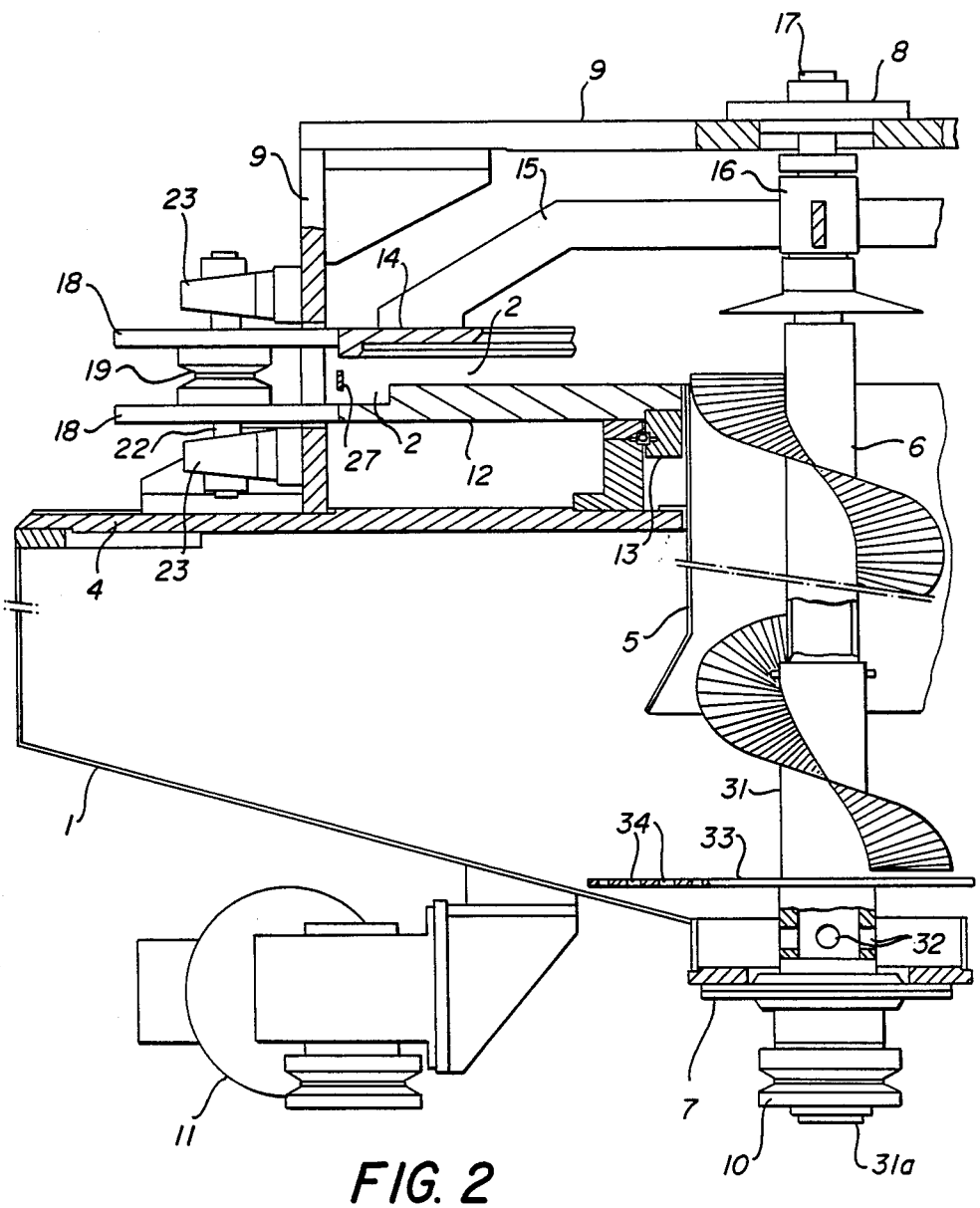
FIG. 2 shows a partial vertical section of the left half of line II—II of the distributor in FIG. 1.

The machine shown in FIGS. 1 and 2 comprises a cylindrical trough 1 with a tapered bottom and mounted on a stand (not shown). The machine has a lateral stopper feeder chute 2 closed by an articulated cover 3.

The upper opening of trough 1 is closed by an annular plate 4 traversed in its center part by cylindrical vertical tube 5 housing an Archimedian screw elevator comprising a center screw 6 mounted rotatingly between lower bearing 7 and upper bearing 8. Center screw 6 is rotatably joined to arch 9 which is fastened to plate 4.

Screw 6 is rotated by pulley 10 by means of a belt (not shown) connecting pulley 10 to gear-motor 11 carried by the machine stand (not shown).

Screw 6 carries a helix of radial brushes. This helix occupies all of the inner space of tube 5 and extends upwardly to a point slightly beyond the upper edge of tube 5.

Tube 5 is fastened to plate 4. The upper edge of tube 5 is level with the upper surface of circular rotating first plate 12. As shown in FIG. 1, plate 12 has a center recess for tube 5. Plate 12 is coaxial with screw 6 and tube 5. First plate 12 rests and revolves on the plate 4 by means of bearing 13.

Above and coaxial with first plate 12 is annular second plate 14. Plate 14 is suspended from three arms 15 rotating at bearing collar 16 on a vertical shaft extension 17 of screw 6.

The vertical distance between second plate 14 and first plate 12 is variable. Collar 16 may be mounted on shaft extension 17 by the use of spacers and inserts which result in an adjustable height for second plate 14.

First plate 12 and second plate 14 have the same outer diameter and are rotated simultaneously by friction with two paired rollers 18. Rollers 18 are equipped with an antiskid band in contact with the edges of plates 12 and 14 (see FIG. 1). Rollers 18 are rotated by center pulley 19, belt 20, and an electric motor 21 which is attached to plate 4. Rollers 18 rotate horizontally on vertical shaft 22 supported by bearings 23 fastened to arch 9.

Figure 3:
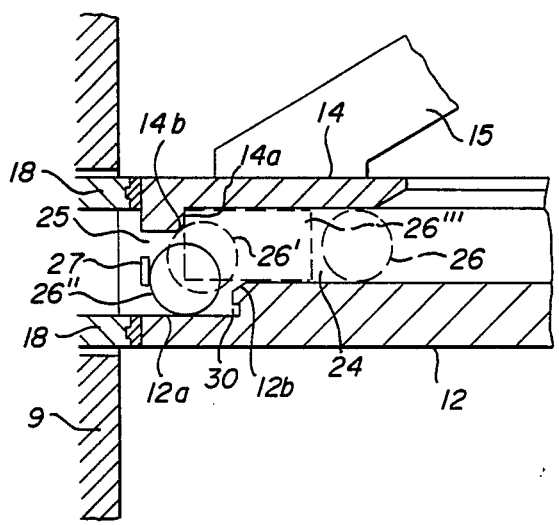
FIG. 3 depicts an enlarged partial view of the positioning passage of the stoppers defined between the two plates of the distributor.

FIG. 3 shows a cross-sectional view of the passage formed between first plate 12 and second plate 14. Moving radially outward, the passage has a cross-section first passage section 24 and a second passage section 25. These sections are vertically offset to form a band or a baffle in the passage. First section 24 has a vertical distance or spacing which is very slightly larger than the diameter of stoppers 26. Second section 25 has a slightly larger height than that of section 24 and is located slightly lower than section 24. Section 25 is defined between annular recess 12a of first plate 12 and annular lip 14a of second plate 14.

Recess 12a and lip 14a define two stepped surfaces in the stopper passage. Stops 12b and 14b on the lower and upper steps are tapered and slightly offset radially. These stepped surfaces form the connecting bend or baffle between the two sections 24 and 25.

The layout of the above elements is such that stopper 26 (the axis of which is essentially perpendicular to the section plane of FIG. 3) rolls under the action of the centrifugal force into first passage section 24, abuts against lip 14a, passes between tapered stops 12b and 14b (stopper in position 26'), and finally comes to rest in second passage section 25 (stopper in position 26") while abutting against a circular guide 27 fastened to plate 4.

In contrast, a skewed stopper such as 26''' (the axis of which would be in the section plane of FIG. 3) would abut against shoulder 14a without being able to descend into section 25 until rotating and becoming positioned like stopper 26'.

Guide 27 (with a rectangular or circular cross-section) is essentially perpendicular to the external edge of the plates 12 and 14 and in the center of the passage section 25. Its role fulfills the function of a means for guiding the stoppers around the circumference of the plates to tangential ejection chute 28 (FIG. 1).

To facilitate the stopper ejection into chute 28, an extraction guide 29 is joined to chute 28 and placed in second passage section 25 in the path of the stoppers rotating with plates 12 and 14. The engaging end of guide 29 slides into circular groove 30 (FIG. 3) machined into plate 12 below stop 12b in the step separating passage sections 24 and 25.

In operation, stoppers are lifted continuously by screw 6 from trough 1 up through tube 5, to above plate 12. After exiting from tube 5, the centrifugal force from rotation of screw 6 and plate 12 move the stoppers away from the center. The stoppers will tend to roll toward the periphery of plate 12 and arrive themselves perpendicular to the centrifugal force (the position of stopper 26 of FIG. 3). The presence of plate 14 does not substantially hinder the rolling of the stoppers as the clearance between the stoppers and plate 14 is on the order of 5-10 mm.

Only stoppers (such as 26' and 26") aligned essentially tangential to the plates will move through and into passage sections 24 and 25. If stoppers arrive in the skewed 26''' position, they are retained in the passage 24 until they pivot 90'. This occurs almost immediately as a result of the rotating velocity of the plates, centrifugal force, and contact with other stoppers including those already in place in passage section 25.

The spacing between plates 12 and 14 is variable so that stoppers with different diameters may be treated.

The rotating velocity of the plates is also variable. It determines the pressure applied to the stopper in the direction of ejection chute 28.

If the ejection chute is open, stoppers are ejected due to the pressure they apply to each other and at a rate that may be controlled by varying the rotating velocity of the plates. If the chute is closed, the stoppers are retained but do not interfere with the rotation of the plates. The plates "slide" on and past the stoppers immobilized in the circular collector conduit 25.

The distributor is therefore able to rotate continuously even if the stopper extraction is discontinued. In this case, the stoppers tend to align themselves end to end in concentric circles on plate 12 and parallel to the stoppers immobilized in circular collector conduit 25. A reserve wheel of stoppers is thus formed.

It is possible to provide a device to limit the formation of this reserve wheel. The device would trigger an instantaneous stop of elevator 6 when, for example, three concentric rows of stoppers have been formed in passage section 24. This device would operate to prevent the clogging of the plate 12 with excess stoppers.

According to a further characteristic of the machine according to the invention, a means for removing dust is provided in the lower part of the trough 1. An exemplary device comprises hollow tube 31 joined to screw 6 in an extension of the screw into the bottom of trough 1.

Tube 31 is perforated in the vicinity of the bottom of trough 1 by connecting holes 32 between the inside of trough 1 and the inside of tube 31. Finally, tube 31 passes through the bottom of trough 1 and connects with pulley 10 being keyed onto the tube 31.

The external end 31a of tube 31 is connected with a vacuum source (not shown) thereby exhausting dust from trough 1 through holes 32. Circular plate 33 is joined to tube 31 and perforated by holes 34. This plate agitates the stoppers in trough 1 and maintains them at a distance from the part of tube 31 carrying holes 32.

The distributor described above may be used to supply stoppers to a stopper processing or marking apparatus.

It should be noted that the invention is applicable for the tangential distribution of any cylindrical object, for any purpose.

Finally, the invention is not intended to be limited to the mode of embodiment shown and described hereinabove. To the contrary, the claimed invention covers all of its variants, in particular, those concerning the means for rotating plates 12 and 14 and the guidance and extraction of the stoppers to and from the periphery of those plates.

I claim:

1. An apparatus for distributing stoppers in an orderly manner comprising:
   a storage area for storing a supply of stoppers having a diameter and a length;
   a first rotatable circular plate having a vertical axis;
   means for moving stoppers from said storage area to a central portion of said first rotatable circular plate;
   a second rotatable plate located coaxially above said first plate, said first plate and said second plate, together, defining a passageway and a baffle, said passageway having a height greater than a stopper diameter and serving to guide said stoppers across said first plate to a peripheral area of said first plate, said baffle being configured to pass stoppers aligned tangentially to said plates into said peripheral area; and
   means for removing stoppers from said peripheral area of said first plate.

2. An apparatus according to claim 1 wherein said baffle is defined by a lip in said second plate and a recess in said first plate.

3. An apparatus according to claim 2 wherein said lip and said recess are radially offset to form a connecting bend into said peripheral area, said connecting bend having an opening width more than one stopper diameter but less than one stopper length.

4. An apparatus according to claim 1 further comprising a stationary guide located around said peripheral area for retaining stoppers in said peripheral area until removed by said means for removing stoppers.

5. An apparatus according to claim 1 wherein said means for moving stoppers comprises a screw elevator coaxial with said vertical axis of said first plate.

6. An apparatus according to claim 1 wherein said second plate is located above said first plate at an adjustable height.

7. An apparatus according to claim 1 wherein said second plate is able to rotate simultaneously with said first plate.

8. An apparatus according to claim 1 wherein said first plate is able to rotate at a velocity that may be varied.

9. An apparatus according to claim 1 further comprising friction rollers in contact with an edge of said first plate and an edge of said second plate and a motor communicating with said rollers thereby causing said first plate and said second plate to rotate when said motor causes said rollers to rotate.

10. An apparatus according to claim 1 further comprising means for removing dust positioned in said storage area for stoppers.

11. An apparatus according to claim 10 wherein said means for removing dust comprises a perforated plate disposed above a bottom area of said storage area and an opening below said plate for discharging dust from said storage area.

* * * * *